United States Patent [19]

Oakley et al.

[11] 3,886,454

[45] May 27, 1975

[54] CONTROL APPARATUS FOR A TWO-WAY CABLE TELEVISION SYSTEM

[75] Inventors: Charles Burkhardt Oakley, Princeton; Hans George Schwarz, Pennington, both of N.J.

[73] Assignee: RCA Corporation, New York, N.Y.

[22] Filed: Aug. 13, 1973

[21] Appl. No.: 387,600

[52] U.S. Cl. .................... 325/52; 325/65; 325/308; 178/DIG. 13

[51] Int. Cl. .................................... H04b 3/04

[58] Field of Search ............................ 325/5.51–53, 325/42, 65, 125, 308, 309, 348; 178/DIG. 1, DIG. 13, DIG. 23; 179/1 B, 1 H, 170 R, 170 E, 170 F

[56] References Cited

UNITED STATES PATENTS

| | | | |
|---|---|---|---|
| 3,255,306 | 6/1966 | Campbell et al. | 178/DIG. 13 |
| 3,668,307 | 6/1972 | Face et al. | 325/308 |
| 3,750,022 | 7/1973 | Curry et al. | 325/308 |
| 3,806,814 | 4/1974 | Forbes | 178/DIG. 13 |

*Primary Examiner*—Robert L. Griffin
*Assistant Examiner*—Jin F. Ng
*Attorney, Agent, or Firm*—Eugene M. Whitacre; Mason DeCamillis

[57] ABSTRACT

In two-way cable television systems, return channel noise inherently limits the number of permissible subscribers. The apparatus of this invention reduces the return noise from subscribers not using the service by means of an adaptive return path amplifier, through carrier operated squelch control or through digital interrogation control.

4 Claims, 5 Drawing Figures

CONTROL APPARATUS FOR A TWO-WAY CABLE TELEVISION SYSTEM

FIELD OF THE INVENTION

This invention relates to cable television systems, in general, and to control apparatus for use in configurations in which data is also transmitted on a return link, in particular. Security monitoring of burglar and fire alarms, viewer preference polling, interactive educational communicatings and similar audience participating programs are some of the additional services which can be offered to subscribers connected to a two-way distribution network.

BACKGROUND OF THE INVENTION

As will be understood, a typical, contemporary one-way cable television system includes a head-end and/or antenna site together with a cable distribution network. The antenna site may be a remote, unattended facility comprising antenna arrays and suitable electronic amplifiers and converters to process incoming signals to the desired frequency and amplitude for the distribution network. The head-end--the control center of the system--may contain VHF and UHF television antennas, AM and FM radio antennas and, in more advanced systems, microwave terminals. In small systems, the head-end is normally located at the antenna site, while in larger systems, it may be located remote from that site and include a studio for local program origination.

Signals from the head-end or studio, in such arrangements, are carried to the subscriber's home by a cable distribution system consisting of a network of trunk and feeder lines. Signal loss in the system is compensated for at periodic intervals by included amplifying apparatus, trunk amplifiers to maintain the signal level on the trunk lines and bridger and line extender amplifiers to provide adequate signal strength at the subscriber terminals. Any frequency dependence of cable loss may further be compensated by the placement of equalizing networks at the various amplifier stations. A number of passive devices make up the remainder of the distribution system, and include line splitters and decoupling devices to provide outputs to several subscribers while preventing interfering signals from entering the distribution system.

The technical problems encountered in distributing television type signals on a single cable over wide areas point up several limitations of the one-way system operation. In such a communications system involving the cascading of a series of amplifiers, signal degradation tends to occur at each component point. Amplifier noise and non-linear effects such as cross-modulation and inter-modulation distortion tend to limit the quality of the picture received--and increase very rapidly as the number of channels transmitted by the system increases. Envelope delay distortion is also present, usually being caused by filters associated with the amplifiers and accumulating as the length of the cable cascade increases. Besides resulting in poor transient response, this latter distortion oftentimes results in the misregistration of color information relative to the luminance information which accompanies it. Additional factors which affect the quality of a received television picture include the presence of reflection echoes (which can occur at the input or output of any active or passive device which is not perfectly matched to the connecting cable), adjacent channel interference, and direct off-the-air reception of co-channel pickup from strong local stations.

The effects of picture degradation caused by individual components of the cable distribution system gradually accumulates, therefore, along the cable route from the antenna site to the most distant subscriber. Because each component contributes its share to the overall picture impairment, only a finite number of devices can be cascaded before an acceptable minimum quality of picture results.

With the introduction of a return channel, however, the accumulation of noise becomes an even greater problem. In the one-way system, it will be appreciated that the noise received at any subscriber terminal is contributed primarily by the amplifiers through which the signal passes in its transmission from the head-end to the subscriber location. In the return channel of a two-way system, however, the excess noise contributed by all return amplifiers and active subscriber terminal equipment is transmitted to the head-end of the distribution system and accumulates there. Since the number of return amplifiers increase with the number of subscribers in a two-way system, return link noise—which would hardly be noted in a small, experimental system—would become a most serious problem in such large two-way commercial systems as would find use in urban distribution networks. The effects of this return noise at the head-end will be seen not only to mask any reply signal sent from the subscriber, but would also degrade information signals as would be sent in proposed systems wherein one subscriber sends information (typically, picture signals) back to the head-end for subsequent distribution to other subscribers. Regardless of whether this noise be considered thermal in nature, in the form of RF pickup, random, Gaussian or coherent, a solution to the noise problem is highly desirable for useful, two-way communications.

SUMMARY OF THE INVENTION

As will become clear hereinafter, the apparatus of the present invention improves the signal-to-noise ratio in a return link channel through the use of carrier squelch circuit control, in one embodiment, and through the use of digital interrogation control, in a second version. With the squelch control arrangement, those noise generating amplifiers which will not be operative in sending a return signal to the head-end can be de-activated. By constructing the squelch circuit to activate the amplifier only in the presence of a signal at its input terminal, the number of squelch circuits required in any one return link can be determined by the size and the layout of the cable distribution system. For conventional system configurations, sufficient noise protection can be obtained with the use of two such circuits operating in tandem, i.e., one, at the feeder line return amplifier and the other at the trunk amplifier adjacent the head-end.

With the digital control version, on the other hand, the address portion of a binary signal which is used to interrogate a subscriber (for security monitoring, for example) can also be used to condition a switch in his relay path to pass return information through the amplifiers serving his particular location. Similar control switches which serve other locations will not be energized at this time because of their differing conditioning codes for subscriber interrogation.

BRIEF DESCRIPTION OF THE DRAWINGS

These and other features of the present invention will be more clearly understood from a consideration of the following description taken in connection with the accompanying drawing in which.

DETAILED DESCRIPTION OF THE DRAWINGS

Figure 1:
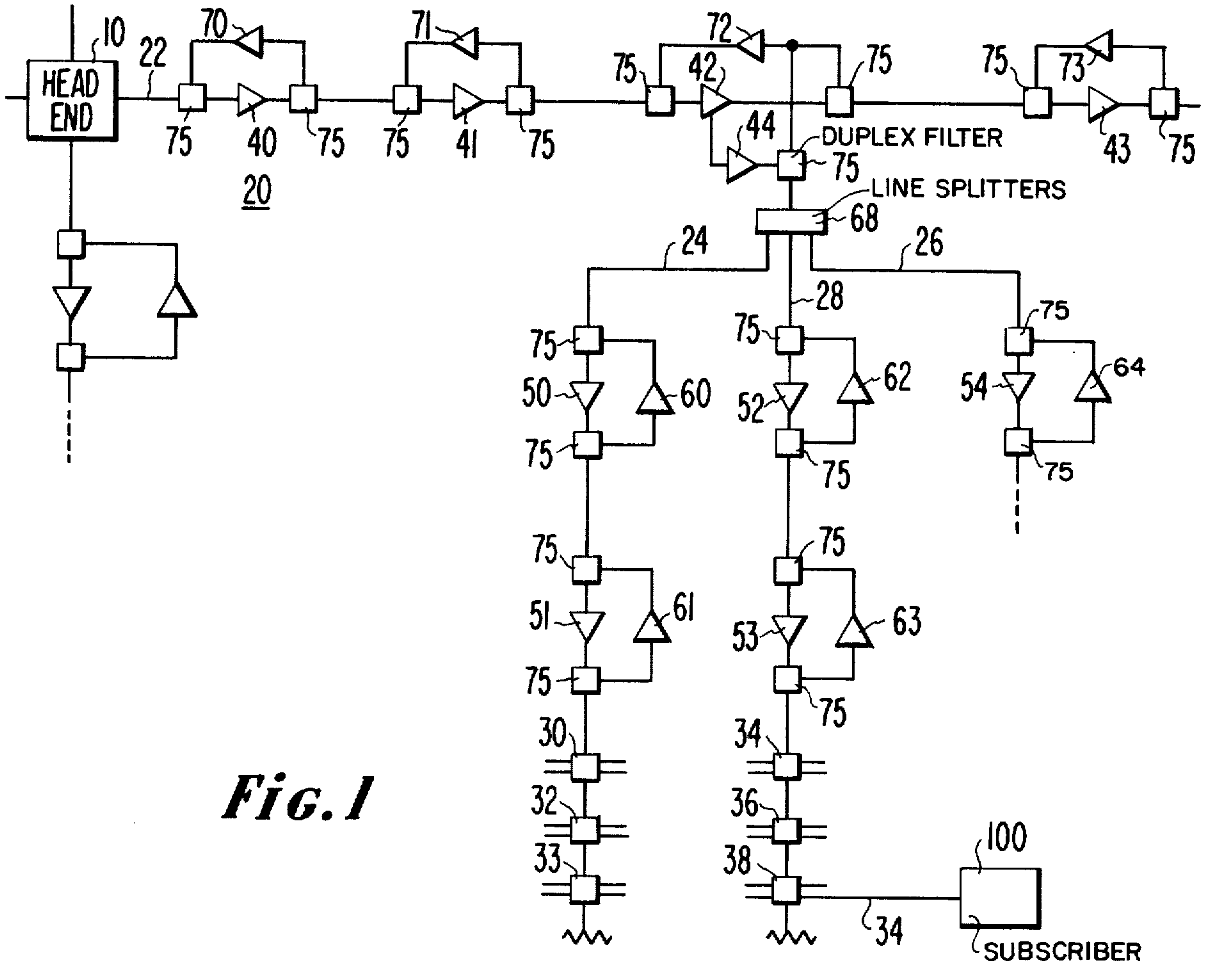
FIG. 1 illustrates one possible two-way cable distribution system arrangement.

The two-way cable distribution system of FIG. 1 is illustrated as consisting of a head-end site 10 and a cable distribution network 20. The head-end, as previously mentioned, may be a remote, unattended facility, comprising antenna arrays and suitable electronic amplifiers and converters to process incoming signals to a desired frequency and amplitude for application to the distribution network. For purposes of the present discussion, the head-end 10 may be considered to comprise the control center of the cable system.

Signals from the head-end 10 are generally carried to a subscriber 100 by the distribution system, typically comprising a network of trunk and feeder lines. In a medium size distribution system—containing a separate antenna site connected to a head-end by a trunk cable, as intended in FIG. 1—the trunk system is generally composed of a main trunk and secondary (or subtrunk) lines 22. The diameters of the cables are selected as design parameters which are determined by system size and channel capacity. The outer conductor diameter of the main trunk cable may typically be 0.750 inches and that of subtrunks, 0.500 or 0.412 inches. Feeder lines—e.g., 24, 26, 28, used to couple between trunk lines and directional taps 30, 32, 34, 36, etc.—for subscribers are also coaxial cables, normally of 0.412 inch diameter. Connection between the directional tap, such as 38, and the subscriber, such as 100, is usually made with a much smaller diameter cable 39.

Cable loss in the system may be compensated for at periodic intervals by amplification. There are usually three types of amplifiers used in a distribution system; namely, trunk amplifiers—the elements 40-43 in FIG. 1, bridger amplifiers—such as the element 44 interspersed between the trunk and the feeder lines, and line extender amplifiers—such as 50–54 located within the feeder line subsequent to its associated bridger amplifier. In present practice, the signals on the trunk line are carried at relatively low levels, and amplified as such by the units 40–43, to minimize non-linear distortion. The bridger and line extender amplifiers, 44 and 50–54, are operated at higher levels to provide adequate signal strength at the terminals of the subscriber after passing through the directional taps. Although not shown, it will be understood that the frequency dependence of cable loss is compensated by equalizing networks at the amplifier stations throughout the system.

In the design of a cable distribution system as so far described, the trunk amplifiers 40–43 are selected to serve only to maintain the signal level on the trunk lines. Amplifiers are spaced at intervals to restore about 20 dB gain in the cable system, and the bridger amplifier 44 is used to interface the feeder system to the trunk line. Such bridger amplifiers may be included in the trunk amplifier housing, in which case they may be referred to, and are available as, trunk/bridgers. In other situations, it may be useful to locate the bridger amplifiers between trunk amplifiers, in which case they are referred to as mid-span bridgers. In either event, the bridger amplifier 44 serves to increase the signal level from the trunk line to the level required for the feeder cables. If the feeder lines from a bridger amplifier are long, or where they supply signals to an area where the density of subscribers is high, line extender amplifiers are employed to provide the amplification along the feeder line. To keep inter-modulation distortion within limits in a practical design, no more than two line extender amplifiers are normally used in cascade connection following a bridger amplifier.

A number of passive devices are also included in the distribution network, line splitters, e.g., 68 in the feeder system, and subscriber taps, 30–38, as in the feeder lines 24, 28. Each tap may contain a decoupling device to prevent interfering signals from entering the distribution system and signal splitters to enable outputs to be provided to many subscribers along the system. In the arrangement thus far disclosed, the trunk amplifiers, the bridger amplifier, and the line extender amplifiers may be selected to pass signals over a frequency range of 50–270 MHz.

For two-way system operation, it becomes desirable to provide a return link from the subscriber 100 to the head-end 10 along these same trunk and feeder lines. To that end, line extender return amplifiers—such as 60–64—are connected in the feeder lines 24, 26, 28. These return amplifiers may be selected to pass return information over a frequency range of 5–30 MHz, and to accommodate them, a series of diplex filters, each denoted by the reference notation 75, are employed together with the higher frequency line extender and bridger amplifiers in conventional coupling manners. Similarly, a plurality of trunk return amplifiers 70–73 are included, combinedly connecting in the trunk line 22 across the amplifiers 40–43 by additional diplex filters 75, the trunk return amplifiers 70–73 also being designed to pass signal frequencies of 5–30 MHz.

As will be readily appreciated, all signals transmitted from the head-end 10 to the cable subscribers (of the form of television channels and data for sequential interrogation for use in burglar and fire alarm systems, viewer preference polling, pay television, meter reading, etc.) may be frequency-multiplexed within the band of 50–270 MHz. Return data originating at the subscriber end could be transmitted back to the head-end 10 in a data channel within the frequency band 5–30 MHz.

Such two-way cable distribution system as illustrated, however, exhibits two serious drawbacks. First, one problem is exhibited by the noise in the return link, contributed by the return amplifiers 60–64 and 70–73. In a one-way cable television distribution system, only the noise contributed by those amplifiers through which the signal passes from the head-end 10 to any one subscriber 100, affects the signal-to-noise ratio present at the subscriber location. Thus, in FIG. 1, only the trunk amplifiers 40, 41, 42, the bridger amplifier 44, and the two line extender amplifiers 52, 53 will contribute to the system noise appearing at the terminals of subscriber 100. In the return transmission system, on the other hand, which handles only one signal at a time though originating sequentially at different subscriber locations, the noise contributed by all return amplifiers in the system, 60–64 and 70–73, will appear together with the return signal at the head-end 10. Because the number of return amplifiers increases with the number of subscribers within the system, the return link noise may become a quite serious problem in large urban distribution networks.

A second return link noise problem results from the fact that no provision exists in the arrangement of FIG. 1 to properly control the amplitude of the return signal. While proposals to automatically gain control each individual trunk return path may provide some solution, it is not adequately effective in gain controlling feeder lines nor in adjusting differences in signal amplitude originating at different subscriber locations. This latter inability to provide gain control in the feeder lines can lead to an inter-modulation distortion of video signals sharing the trunk return path in those environments where video return signals are to be transmitted on the trunk lines from one subscriber to another via the head-end 10. This may result if the data signal amplitude increases over its nominal design value—while, on the other hand, if it should decrease, even poorer signal-to-noise ratio at the head-end receiver will result. These difficulties, though, may be reduced by employing the squelch circuit arrangements of FIGS. 2 and 3.

The signal-to-noise ratio in a return link channel of FIG. 1 can be improved with a plurality of squelch circuits operating in conjunction with certain selected return amplifiers. These squelch circuits can be of the type which respond only to the presence of a signal at an amplifier input. The number of squelch circuits actually required in any one return channel will be determined by the size and the layout of the cable television distribution system. However, for the type of system outlined, sufficient noise protection should be obtainable with a pair of squelch circuits operating in tandem. More particularly, improvement in signal-to-noise ratio should follow the inclusion of one squelch circuit at each line extender return amplifier position adjacent a bridging amplifier, and another at each trunk amplifier position adjacent the head-end.

Figure 2A:
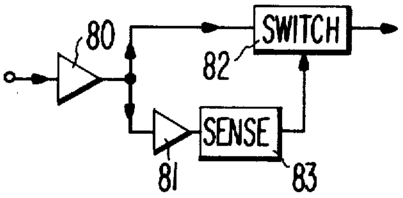
FIGS. 2A–2C are block diagrams of possible squelch circuits, constructed in accordance with the present invention, and usable in the system of FIG. 1.

This is illustrated in FIG. 2A in which the squelch control includes a pair of amplifier circuits 80, 81, an electronic switch 82, and a signal amplitude sensor 83. When connected in a feeder line, the input to amplifier 80 may be provided from the diplex filter 75 adjacent to the output of the line extender amplifier 50, for example, and the output of the electronic switch 82 may be coupled to the left most terminal of the splitter 68 by means of the diplex filter 75 preceeding the line Extender Amplifier 50, in which case this squelch control serves as a replacement for the return amplifier 60. When coupled to the output of the trunk return amplifier 70 (at its diplex filter), on the other hand, the amplifier 80 will cause the electronic switch 82 to provide its output signal to the head-end 10. As will be seen, the output terminal of the amplifier 80 couples both to the input of amplifier 81 and to an input of the switch 82, the control for which is provided by the signal sensor 83 in response to the output from amplifier 81. In operation, this squelch circuit will amplify a return signal for application to the switch 82 and, if such signal is in excess of a predetermined threshold level, the signal sensor 83 will condition the switch 82 to pass this return information to the splitter 68 and to the head-end 10, as the case may be.

Figure 2B:
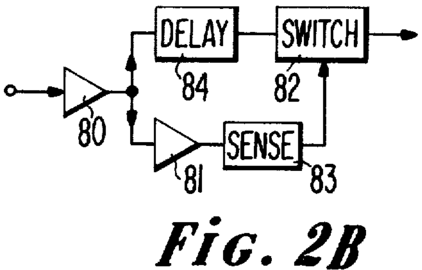

The configuration of FIG. 2B is especially attractive in activating the squelch control without losing any message information due to delay present within the circuitry. That is, it will be readily apparent that any delay in activating the signal sensor 83 and electronic switch 82 in the FIG. 2A construction could cause a loss of some of the return link information from reaching the splitter 68 and head-end 10. Such characteristic is offset by the FIG. 2B construction through its use of a delay line 84, coupled between the amplifier 80 and the electronic switch 82, and selected of a delay to equal the time constant of the amplifier 81 and signal sensor 83 in conditioning the switch 82. In this manner, the time that it takes to set the sensor 83 in activating the switch 82 will substantially match the delay imparted by the line 84 so that no message bits will be lost in traversing the squelch control.

Figure 2C:
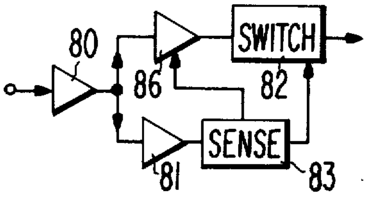

The FIG. 2C construction includes a gain controllable amplifier 86 in place of the delay line 84 (although in some instances inclusion of a delay line before the amplifier 86 may be desirable). When the signal sensor 83 conditions the switch 82 in FIG. 2C, it also develops a direct current control indication of input signal strength. This control is used in adjusting the gain of amplifier 86 to maintain a substantially constant signal amplitude at the input of the switch 82. As in FIGS. 2A and 2B, the output of the switch 82 may be coupled to the splitter 68 (when the squelch circuit is included in the feeder lines) or to the head-end 10 (when the squelch circuit is incorporated in the trunk line adjacent the control center of the cable system).

Figure 3:
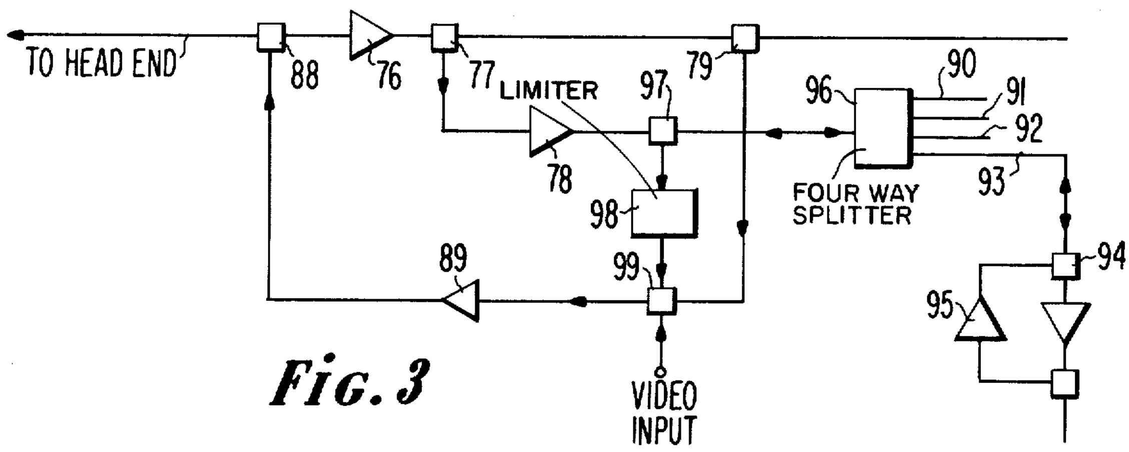
FIG. 3 illustrates a further arrangement, in accordance with the invention, employing both squelch and/or gain control in the return amplifier link of such a cable distribution system.

The configuration of FIG. 3 also includes apparatus to equalize data signal levels for return signals which originate at different locations. Investigation has indicated that this can best be done at the point where the return data signals enter a trunk line, i.e., at the bridging amplifier.

In FIG. 3, the feeder lines are represented by the notations 90–93, with the line 93 being supplied return signal information from a diplex filter 94 to which a 5–30 MHz line extender return amplifier 95 is coupled. A four-way splitter 96 is illustrated as receiving the return signals and applying them through a diplex filter 97 to a limiter 98. Video input signals for transmission to the head-end 10 may be added to the amplitude limited return signals in a combiner stage 99, and provided thence by means of a trunk return amplifier 89 of 5–30 MHz bandwidth for application to the head-end via a second diplex filter 88. In addition to the limiting equalizing the amplitudes of return signals supplied along the feeder lines 90–93 to the head-end, a filter may be included in the limiter 98 to suppress any harmonics which might be generated by the equalization process afforded. In this arrangement, the amplifier 95 may conform to either the FIG. 2A or 2B squelch control constructions above, while the amplifier 89 may be constructed according to the FIG. 2C teachings. The remaining elements illustrated in FIG. 3 represent a trunk amplifier 76 having a 50–270 MHz passband, a directional coupler 77, a bridging amplifier 78, also of 50–270 MHz bandwidth, and a diplex filter 79.

The foregoing described the use of squelch control circuits in improving the signal-to-noise ratio of a return signal at the receiving location. The same improvements can be accomplished by a somewhat different scheme, employing digital interrogation control which is well known in the art and shown in various publications. One such publication is INFORMATION TRANSMISSION, MODULATION AND NOISE second Edition by Mischa Schwartz; McGraw-Hill Book Company. There, instead of using squelch circuits which are controlled—as in FIGS. 1–3—by the return signals, switch control can be affected at appropriate points in the distribution system through the use of address code recognition devices.

One such recognition device, for example, could be inserted between the diplex filter 97 and the limiter 98 of FIG. 3. The electronic switch of the recognition device could serve to connect the filter 97 to the limiter 98 under the control of a code signal identifying an interrogated subscriber, which code could be provided at a point in the downstream direction from the head-end—as at a directional coupler inserted between the bridging amplifier 78 and the diplex filter 97.

In operation, whenever an interrogating message transmitted from the head-end indicates that an answering return is to pass through for processing (for purposes of security monitoring, viewer preference polling, etc.), the digital circuitry in the recognition device would be provided its control signal. The connection from the diplex filter 97 to the limiter 98 would thus close and would remain closed until the return message has passed. By assigning a common group of address bits to all subscribers connected through a given bridging amplifier 78, for example, to which the recognition device is connected, the logic needed to condition passage of return messages to the head-end could be simplified.

In addition to noting that the recognition device could be installed at points in the system other than adjacent a bridging amplifier, it will be seen that one of its advantages resides in the fact that it requires no additional delay circuit, as in FIG. 2B. The time required for completing an interrogation cycle will thereby be lessened, the import of which increases as the size of the cabling system is enlarged.

While there have been described what are considered to be preferred embodiments of the present invention, it will be understood that other modifications may be made by those skilled in the art without departing from the scope of the teachings herein. For example, whereas the squelch control has been illustrated as operative in the line extender return amplifier apparatus, it will be seen that similar controls can be afforded by connecting such squelch circuits on the bridger side of the signal splitter shown rather than on the line extender side.

What is claimed is:

1. In a closed circuit distribution system of the type in which television signals are sent along a transmission line from a central location to a plurality of remote receiver locations for reproduction thereat and in which return signals are also sent along said transmission line back from said remote locations to said central location for processing as part of a two-way communications network, the combination therewith of:

means located between said central and remote locations for electrically disconnecting said central location from selected ones of said remote locations in the presence of return signals below predetermined amplitude levels, including amplifier apparatus having amplitude sensing means responsive to a given threshold, said amplitude sensing means being inhibited by the presence of return signal amplitudes below said given threshold level, but actuated by the presence of return signal amplitude beyond said threshold level to couple said return signals from said remote to said central locations.

2. The combination of claim 1 wherein said means also includes an electronic switch responsive to said amplitude sensing means to couple said return signal from said remote to said central locations in the presence of return signal amplitudes beyond said threshold level, and wherein there is further included means for delaying the application of said return signal to said electronic switch substantially until such time as said switch is enabled by said sensing means to pass said return signal to said central location.

3. The combination of claim 1 wherein said means also includes an electronic switch responsive to said amplitude sensing means to couple said return signal from said remote to said central locations in the presence of return signal amplitudes beyond said threshold level, and wherein there is further included additional means for sensing the amplitude of the return signal to be coupled via said switch to said central location and for varying the gain of said amplifier apparatus in response to the existence of return signal amplitudes in excess of a given level.

4. The combination of claim 1 wherein said means includes an address code recognition circuit which enables return signals from said remote to said central locations when preceeded by the transmission of code signals along with said television signal identifying those remote receiver locations which are to be communicated for processing to said central location.

* * * * *